No. 722,313. PATENTED MAR. 10, 1903.
T. A. MARTIN.
SHEARING AND CLIPPING CUTTERS.
APPLICATION FILED DEC. 29, 1902.

NO MODEL.

WITNESSES
James C. Herron.
S. R. Bell.

INVENTOR,
T. Arthur Martin,
by Snowden Bell,
Att'y.

UNITED STATES PATENT OFFICE.

THOMAS ARTHUR MARTIN, OF BRAINERD, MINNESOTA.

SHEARING OR CLIPPING CUTTERS.

SPECIFICATION forming part of Letters Patent No. 722,313, dated March 10, 1903.

Application filed December 29, 1902. Serial No. 136,903. (No model.)

*To all whom it may concern:*

Be it known that I, THOMAS ARTHUR MARTIN, of Brainerd, in the county of Crow Wing and State of Minnesota, have invented a certain new and useful Improvement in Shearing or Clippling Cutters, of which improvement the following is a specification.

The object of my invention is to provide in simple, compact, and inexpensive form a cutting device which shall be particularly applicable to use in any class of power or hand machines for shearing or clipping wool or hair which will admit of the cutters being removed and sharpened by an unskilled operator without the employment of expensive machinery and by which a perfect shearing cut of the material operated on may be effected.

The improvement claimed is hereinafter fully set forth.

Figure 1:
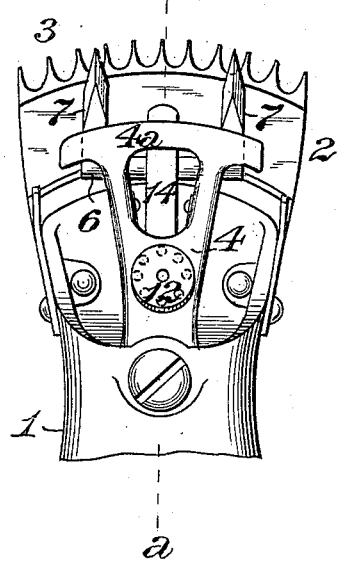
Figure 2:
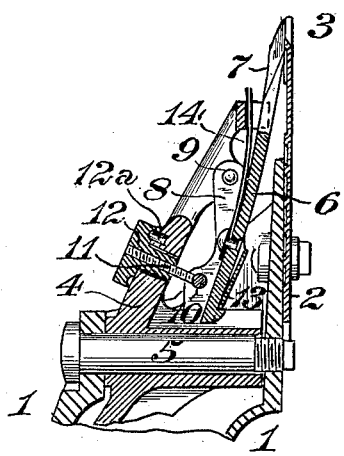

In the accompanying drawings, Figure 1 is a front view in elevation of a cutting appliance, illustrating an embodiment of my invention; and Fig. 2 a transverse section through the same on the line $a\ a$ of Fig. 1.

In the practice of my invention I provide a tubular handle or casing 1, on the outer end of which is secured a fixed cutter or comb 2, provided with a plurality of blades or fingers 3, which have cutting edges on each of their sides. The inner face of the fixed cutter over which, as hereinafter explained, the movable cutter traverses is plane, and the sides of the fingers are inclined toward the outer face of the cutter, so as to present suitable cutting edges. The surface of the fixed cutter is, except where the movable cutter traverses, recessed or grooved out, so as to lessen the amount to be faced off in sharpening, thereby making it practical for the operator to do so with oil and emery on a cast-iron faceplate. A vibratory cutter-lever 4 is journaled on a bearing-pin 5, secured in the casing 1 below the fixed cutter, and is adapted to be vibrated about the axis of said pin by any suitable mechanism, which, as it does not constitute part of my present invention, is not herein shown.

A movable cutter composed of a T-shaped body 6 and two or more blades or teeth 7, having inclined cutting edges on their opposite sides, is fitted removably in a carrier 8, having two parallel arms which extend on opposite sides of the body 6 of the movable cutter and are pivoted at their outer ends to the cutter-lever 4 by pins 9. A transverse pin or bar 10 is fixed in the carrier adjacent to the inner or free ends of its side arms, and a screw 11 is fixed to and projects from the pin 10 into an opening formed in the outer arm of the cutter-lever and engages an adjusting-nut 12, which fits freely in said opening and is provided with a milled head or other equivalent means by which it may be turned, as required. The adjusting-nut 12 is prevented from turning while the cutters are in operation by a spherical headed pin $12^a$, fixed in the cutter-lever, which engages one of a plurality of similarly-formed recesses on the inner face of the milled head. The movable cutter fits in a groove or recess in the cutter-lever, the ends of which keep the cutter in position laterally, and a hook is formed on the inner end of the body of the movable cutter, which engages a transverse bar 13 on the carrier, thus securing the inner end of the movable cutter. The outer sides of the blades or teeth 7 of the movable cutter abut against and traverse over the inner faces of the fingers 3 of the fixed cutter. A spring 14, which may be made of one or more plates of elastic metal, is riveted or otherwise connected at its inner end to the body of the movable cutter, and the outer end of said spring abuts against a transverse stop-bar $4^a$ on the outer arm of the cutter-lever 4, thus holding the movable cutter 7 firmly against the fixed cutter 2. By the rotation of the adjusting-nut 12 in one or the other direction the inner end of the carrier may through the pin 10 and screw 11 be moved toward or from the cutter-lever, thereby changing the position of the movable cutter-points at their contact with the fixed cutter. As the inner end of the carrier is drawn toward the cutter-lever it causes the points of the movable cutter to press harder against the points of the fixed cutter or comb, and as the movable cutter-points drop into the spaces between the fixed cutter-points they are necessarily compelled to rise, thus causing the edges only of the two cutters to come in contact.

It will be seen that the appliance is of simple construction, easy and accurate adjustment, and free from liability to breakage or derangement of its parts in operation. The relation of the cutting edges of the fixed and movable cutters is such that a true and effective shearing cut is produced by the vibratory movements of the movable cutter about the axis of its bearing-pin.

I claim as my invention and desire to secure by Letters Patent—

1. The combination of a handle or casing, a fixed cutter secured thereto, a vibratory cutter-lever pivoted thereto, a movable cutter fitted adjustably on the cutter-lever, and means for varying and adjusting the bearing of the movable cutter on the fixed cutter.

2. The combination of a handle or casing, a fixed cutter secured thereto and having its face recessed or channeled below its teeth, a vibratory cutter-lever pivoted to the handle, a movable cutter fitted adjustably on the cutter-lever, and means for varying and adjusting the bearing of the movable cutter on the fixed cutter.

3. The combination of a handle or casing, a fixed cutter secured thereto, a vibratory cutter-lever pivoted thereto, a movable cutter fitted adjustably on the cutter-lever, and a spring, bearing, adjacent to its opposite ends, on the movable cutter and on the cutter-lever.

4. The combination of a handle or casing, a fixed cutter secured thereto, a vibratory cutter-lever pivoted thereto, a movable cutter adjustably connected to the cutter-lever, a spring, bearing, adjacent to its opposite ends, on the movable cutter and on the cutter-lever, and means for varying and adjusting the bearing of the movable cutter on the fixed cutter.

5. The combination of a handle or casing, a fixed cutter secured thereto, a vibratory cutter-lever pivoted thereto, a carrier pivoted to the cutter-lever, a movable cutter fitted on the carrier and abutting at one end thereon and at the other on the fixed cutter, and a spring bearing on the movable cutter and on the cutter-lever.

6. The combination of a handle or casing, a fixed cutter secured thereto, a vibratory cutter-lever pivoted thereto, a carrier pivoted to the cutter-lever and depending on the side of its pivots which is farther from the fixed cutter, a screw connected to the carrier adjacent to its free end, an adjusting-nut engaging said screw and fitting freely in the cutter-lever, a movable cutter fitted in the carrier and bearing thereon and on the fixed cutter, and a spring bearing on the movable cutter and on the cutter-lever.

7. The combination of a handle or casing, a fixed cutter secured thereto, a vibratory cutter-lever pivoted thereto and having a transverse stop-bar on its end adjoining the fixed cutter, a carrier having side arms pivoted to the cutter-lever and connected by a transverse bar, a movable cutter having a body fitting between the side arms of the carrier and abutting on the transverse bar thereof and having cutting-teeth adjoining and bearing on the fixed cutter, a spring bearing on the stop-bar of the cutter-lever and on the body of the movable cutter, a screw connected to the carrier adjacent to its free end, and an adjusting-nut fitting in the cutter-lever and engaging said screw.

THOMAS ARTHUR MARTIN.

Witnesses:
JOEL SMITH,
J. A. BACHELDER.